United States Patent
Brandt et al.

(10) Patent No.: US 9,450,770 B2
(45) Date of Patent: Sep. 20, 2016

(54) COMMUNICATIONS SYSTEM AND METHOD

(75) Inventors: Marc Brandt, Eybens (FR); Alain Guigui, Bresson (FR); John O'Connell, Uriage-les-Bains (FR); David Mansutti, Valbonne (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 478 days.

(21) Appl. No.: 13/146,939

(22) PCT Filed: Jan. 26, 2010

(86) PCT No.: PCT/EP2010/050870
§ 371 (c)(1),
(2), (4) Date: Jan. 5, 2012

(87) PCT Pub. No.: WO2010/086307
PCT Pub. Date: Aug. 5, 2010

(65) Prior Publication Data
US 2012/0102108 A1    Apr. 26, 2012

(30) Foreign Application Priority Data
Jan. 30, 2009   (EP) ..................... 09305087

(51) Int. Cl.
*G06F 15/16*   (2006.01)
*H04L 12/18*   (2006.01)
*H04L 29/08*   (2006.01)

(52) U.S. Cl.
CPC ..... *H04L 12/1827* (2013.01); *H04L 29/08576* (2013.01); *H04L 67/14* (2013.01); *H04L 67/148* (2013.01)

(58) Field of Classification Search
CPC ............... H04L 67/306; H04L 63/104; H04L 29/08576; G06Q 10/10; G06Q 50/00; G06Q 50/10
USPC .................................. 370/328; 709/227, 228
See application file for complete search history.

(56) References Cited

U.S. PATENT DOCUMENTS

| | | | |
|---|---|---|---|
| 2004/0078468 A1* | 4/2004 | Hedin | H04L 69/08 709/227 |
| 2005/0091059 A1* | 4/2005 | Lecoeuche | 704/270.1 |
| 2006/0031370 A1* | 2/2006 | Lyle | H04L 12/581 709/207 |
| 2007/0112965 A1* | 5/2007 | Eftis | H04L 12/581 709/227 |
| 2007/0121584 A1* | 5/2007 | Qiu et al. | 370/352 |
| 2007/0150933 A1* | 6/2007 | Dougherty | H04L 63/102 726/1 |

(Continued)

FOREIGN PATENT DOCUMENTS

| | | |
|---|---|---|
| CA | 2628560 | 12/2008 |
| CN | 101102185 | 1/2008 |

(Continued)

OTHER PUBLICATIONS

European Patent Office, International Search Report and Written Opinion of PCT/EP2010/050870 dated Jul. 21, 2010 (13 pages).

(Continued)

*Primary Examiner* — Aftab N. Khan
(74) *Attorney, Agent, or Firm* — HGF Limited

(57) ABSTRACT

Embodiments of the present invention relate to a communication system and method for supporting multiple communications between users using a plurality of different services.

9 Claims, 5 Drawing Sheets

(56) References Cited

U.S. PATENT DOCUMENTS

| | | | |
|---|---|---|---|
| 2007/0192299 A1* | 8/2007 | Zuckerberg | G06Q 10/10 |
| 2007/0192465 A1* | 8/2007 | Modarressi | H04L 67/10 |
| | | | 709/223 |
| 2008/0212523 A1* | 9/2008 | Kuure | H04L 69/40 |
| | | | 370/328 |
| 2008/0232248 A1* | 9/2008 | Barave | H04L 12/5855 |
| | | | 370/230 |
| 2008/0307519 A1 | 12/2008 | Curcio et al. | |
| 2009/0030985 A1* | 1/2009 | Yuan | H04L 67/306 |
| | | | 709/204 |
| 2009/0210538 A1* | 8/2009 | Allen | H04L 67/14 |
| | | | 709/227 |
| 2010/0114896 A1* | 5/2010 | Clark | H04L 12/66 |
| | | | 707/741 |
| 2010/0131660 A1* | 5/2010 | Dec | H04L 41/0806 |
| | | | 709/228 |
| 2010/0180028 A1* | 7/2010 | Deason | H04L 29/12528 |
| | | | 709/225 |

FOREIGN PATENT DOCUMENTS

| | | |
|---|---|---|
| CN | 101127597 | 2/2008 |
| CN | 101340443 | 1/2009 |
| CN | 101352017 A | 1/2009 |
| EP | 1241853 A2 | 9/2002 |

OTHER PUBLICATIONS

European Patent Office, Search Report of EP Appl. No. 09305087.0 dated Apr. 29, 2009 (8 pages).

State Intellectual Property Office of People's Republic of China. Search Report. Appliation No. 201080006144.8. Filing Date Jan. 26, 2010.

* cited by examiner

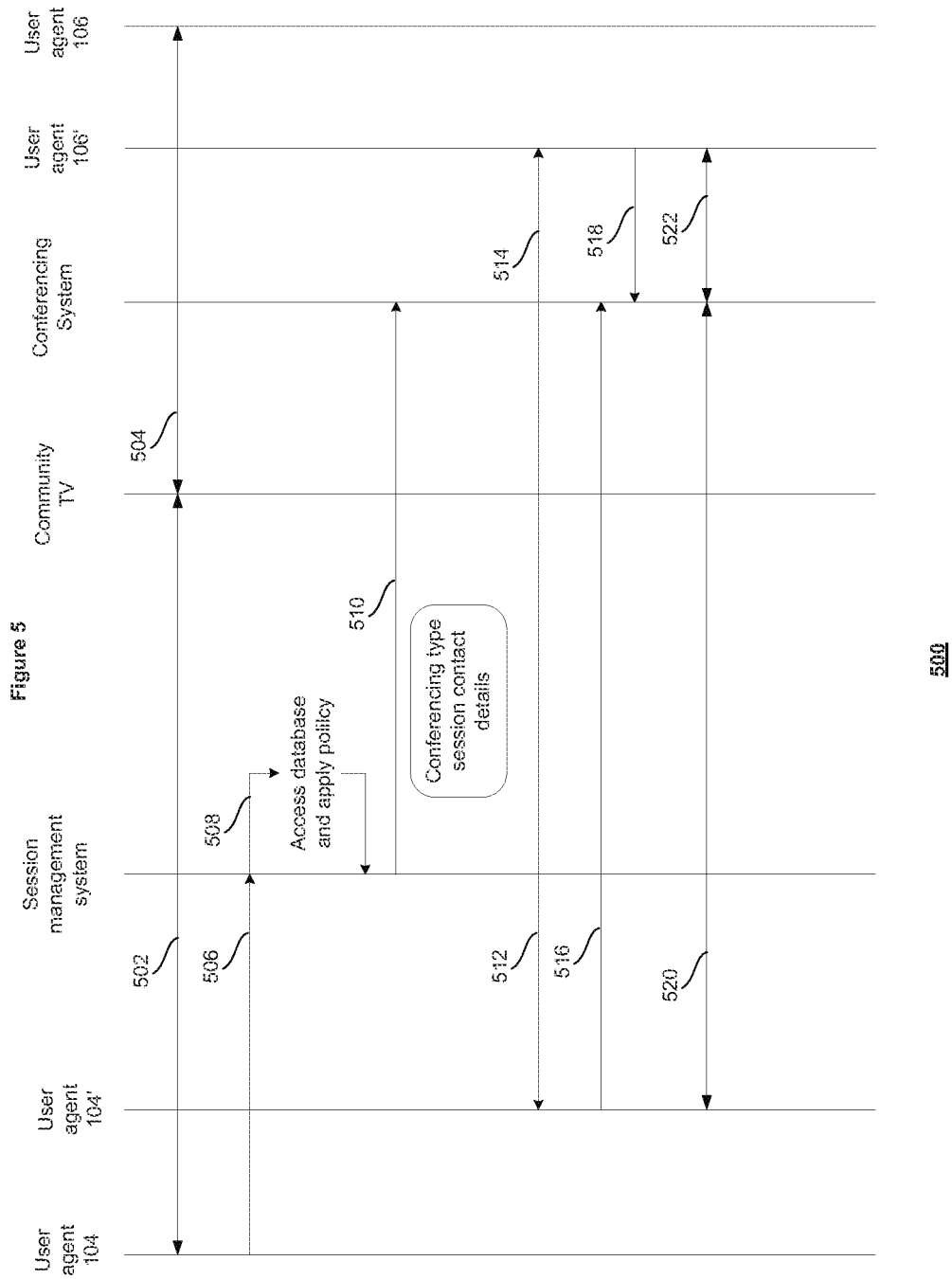

COMMUNICATIONS SYSTEM AND METHOD

CROSS-REFERENCE TO RELATED APPLICATION

This application is a national stage application under 35 U.S.C. §371 of PCT/EP2010/050870, filed Jan. 26, 2010, which claims priority to EP Patent Application No. 09305087.0, filed Jan. 30, 2009.

Embodiments of the present invention relate to a communication system and method.

Communication systems have developed to such an extent that users are more and more using services as communities of users rather than as individuals. For example, communally watching a TV programme, playing an on-line collaborative game, participating in a conference call, a chat room or using an instant messaging service are current forms of communicating that support group sessions. However, difficulties arise if users want to spawn or establish further communication sessions or if users wish to maintain a measure of privacy.

Often collaborative or group experiences involve exchanges and interactions with third parties with whom one is unfamiliar. There is an understandable reluctance to share contact information with such parties notwithstanding a willingness or desire to engage with them socially via a group or private communication session. Conventionally, a degree of familiarity enables or affords some measure of comfort when disclosing personal contact information such as a mobile phone number or an email address. However, as mentioned, a reluctance to disclose such personal contact information manifests itself in informal group communication sessions.

Furthermore, the various services available to group users might typically be supplied by different service providers. For example, online gaming, audio conferencing, instant messaging, PTT, community TV and other forms of group communication and interaction would usually be provided by different legal entities, which does not lend itself to seamless transitions from one communication session to another.

It is an object of embodiments of the present invention to at least mitigate the effects of one or more than one of the prior art problems.

SUMMARY OF THE INVENTION

Accordingly, embodiments of the present invention provide a communication system and method as defined in the claims Advantageously, embodiments of the present invention support establishing a new communication session between two or more group participants notwithstanding (a) those two participants wishing to maintain some degree of privacy, and (b) current and desired services being supported by different service providers, taken jointly or severally.

DESCRIPTION OF THE DRAWINGS

Embodiments of the invention will be described by way of example only, with reference to the following drawings in which:

FIG. 5 illustrates a signalling diagram according to an embodiment.

DETAILED DESCRIPTION

Figure 1:
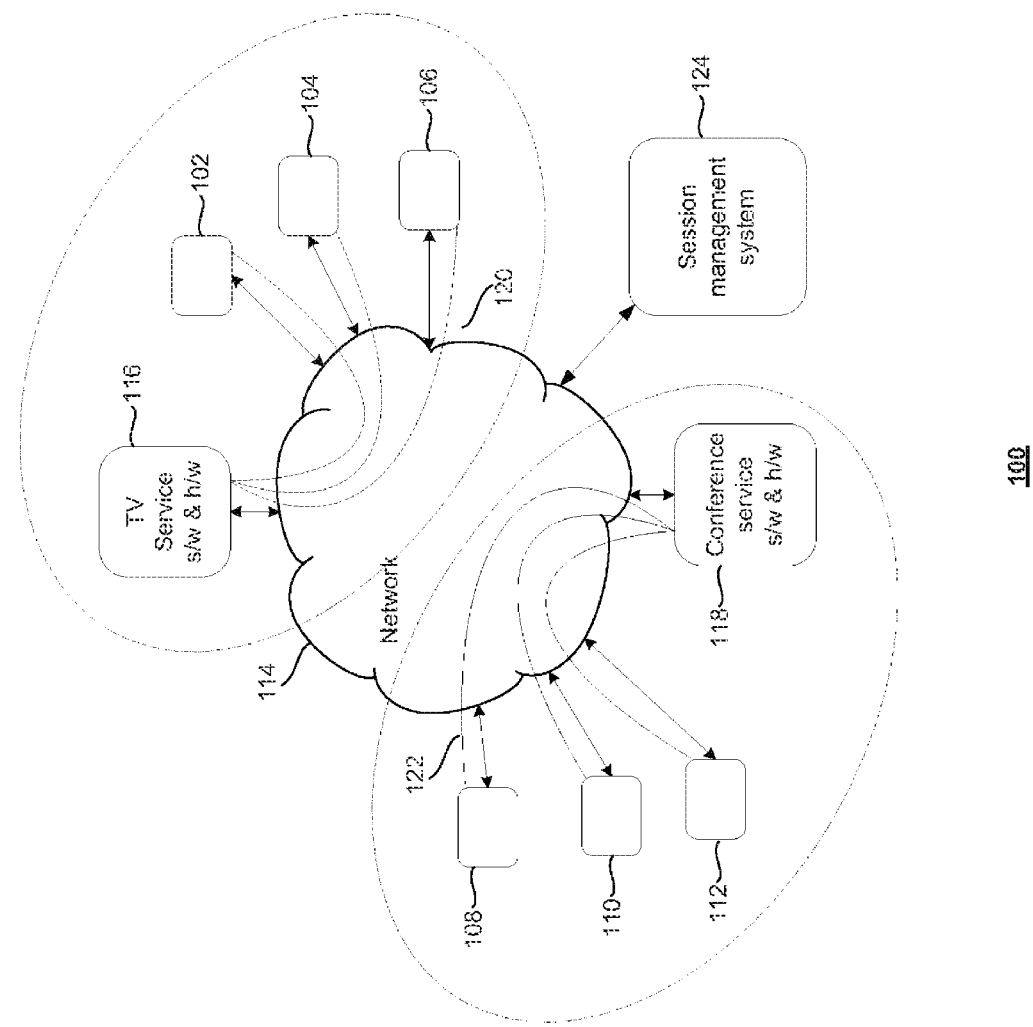
FIG. 1 shows a communication arrangement according to an embodiment.

FIG. 1 shows schematically a communication arrangement 100 in which a plurality of user agents 102 to 112 are coupled to a network 114. The user agents 102 to 112 represent systems, devices, apparatuses, equipment and the like via which users (not shown) thereof can participate in a communication session or activity. The communication session or activity can be a group session or activity, involving more than two parties, or a communication session or activity involving only two parties. In some instances, such as, for example, a broadcast, the communication session might involve only a single party. In the illustrated example, it can be appreciated that users of user agents 102 to 106 are using a TV service, supported or provided by TV service software and equipment 116, via which they are receiving the same TV programme. Users of user agents 108 to 112 are involved in an audio conference call via a respective conference service supported by at least one of conferencing software and equipment 118. The provision of the services or, more accurately, data streams, flows, paths or packets associated with or implementing the services are depicted via the two groups of dashed lines 120 and 122 between the user agents 102 to 112 and respective equipment 116 and 118.

One skilled in the art appreciates that the plurality of services, such as, for example, the community TV service and the audio conference service, might be provided by different service providers. Alternatively, the plurality of services might be provided by the same service provider.

The user agents 102 to 112 communicate with a session management system 124 to establish the group communication sessions or activities such as the above-described community TV service and audio conference call. The session management system 124 is arranged to supply identification and/or contact data to the service providers; namely, the TV service software and hardware 116 and the conference service hardware and software 118 in the present embodiment, to allow requested services to be used or consumed by the users of the user agents 102 to 112.

Figure 2:
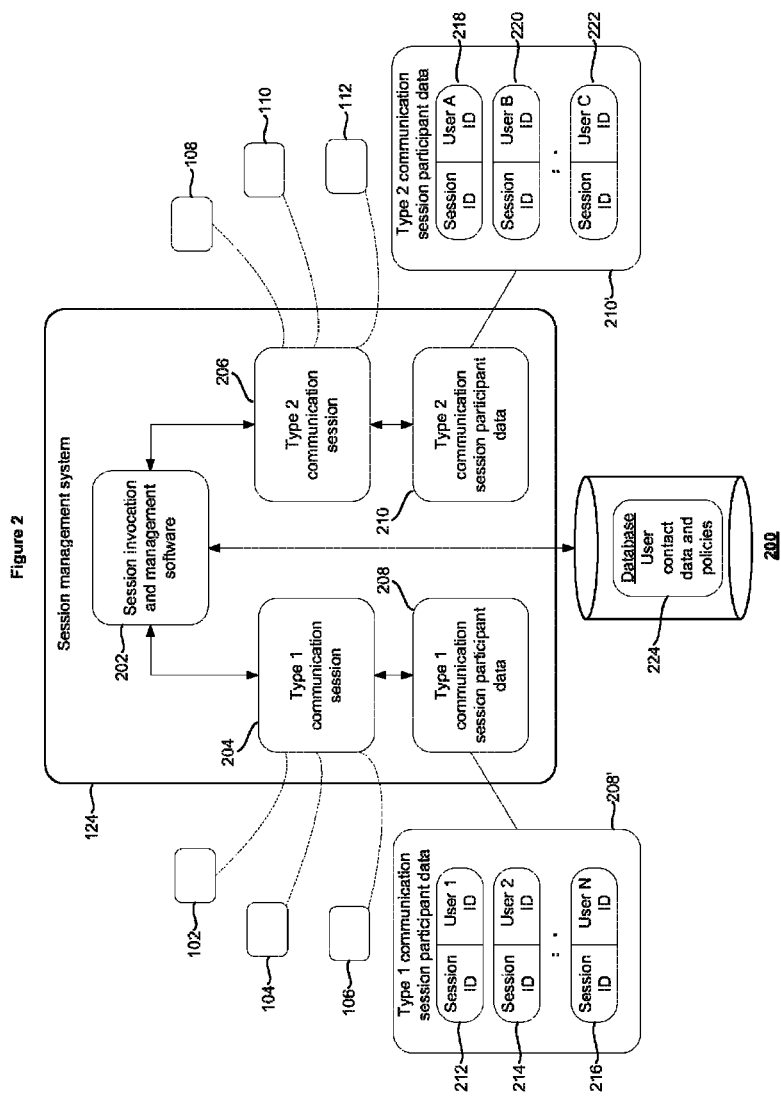
FIG. 2 illustrates a session management system according to an embodiment.

Referring to FIG. 2, there is shown, in greater detail, a view 200 of the session management system 124. The session management system 124 comprises session invocation and management software 202 that is responsible for establishing and maintaining communication sessions or group activities. In particular, session invocation and management software 202 ensures that appropriate contact information or identification information is made available to the service provider systems 116 and 118 to support communication between or data exchanges with the user agents 102 to 112 according to their desired sessions.

The session invocation and management software 202 maintains data associated with respective types of communication session. In the embodiment shown, data 204 and 206 is associated with first and second types of communication sessions respectively. The data 204 and 206 may comprise, for example, an indication of the number of participants to the session, data for accessing or identifying contact data 208 and 210 associated with the respective participants to the sessions 204 and 206.

The contact data 208 is shown in an expanded form 208' and 210'. It can be appreciated that the type 1 communication session participant data 208' comprises a plurality of pairs of data 212 to 216 that can be used in identifying and communicating with the user agents 102 to 106 associated with the type 1 communication session. In the illustrated embodiment, the pairs of data 212 to 216 comprise tuples that associate user identification or contact data, user 1 ID, user 2 ID, . . . , user N ID, with respective session identifiers that identify the communication session or activity within which the user agents 102 to 106 are participating.

Although the present embodiment has been illustrated using a type 1 communication session 204 in which there are N participants, embodiments are not limited to such an arrangement. Embodiments can be realised in which one or more participants can be party to the type 1 communication session 204.

The type 2 communication session participant data 210' comprises a plurality of pairs of data 218 to 222 that can be used in identifying and communicating with the user agents 108 to 112 associated with the type 2 communication session. In the illustrated embodiment, the pairs of data 218 to 222 comprise tuples that associate user identification or contact data, user A ID, user B ID, . . . , user C ID, with respective session identifiers that identify the communication session or activity within which the user agents 108 to 112 are participating.

Although the present embodiment has been illustrated using a type 2 communication session 206 in which there are C participants, embodiments are not limited to such an arrangement. Embodiments can be realised in which one or more participants can be party to the type 2 communication session 206.

The present embodiment refers to the extant communication sessions using the generic terms "type 1 communication session" and "type 2 communication session". The "type 1 communication session" can be any type of communication session such as, for example, a communication session associated with the community TV service provided by the TV service software and hardware system 116 or the audio conference session provided by the audio conference system 118. Equally, the communication session can be any other type of communication such as, for example, those mentioned herein. Similarly, the same applies to the type 2 communication session, which can, itself, be any type of communication session, which might be the same type of session as the type 1 communication session or which might be a different type of session as compared to the type 1 communication session.

The session management system 124 also comprises, or at least has access to, a database 224 of user contact data and policies that are used to establish communications between the user agents 102 to 112 according to whether or not respective criteria or any respective criterion defined by the policies have or has been met.

Figure 3:
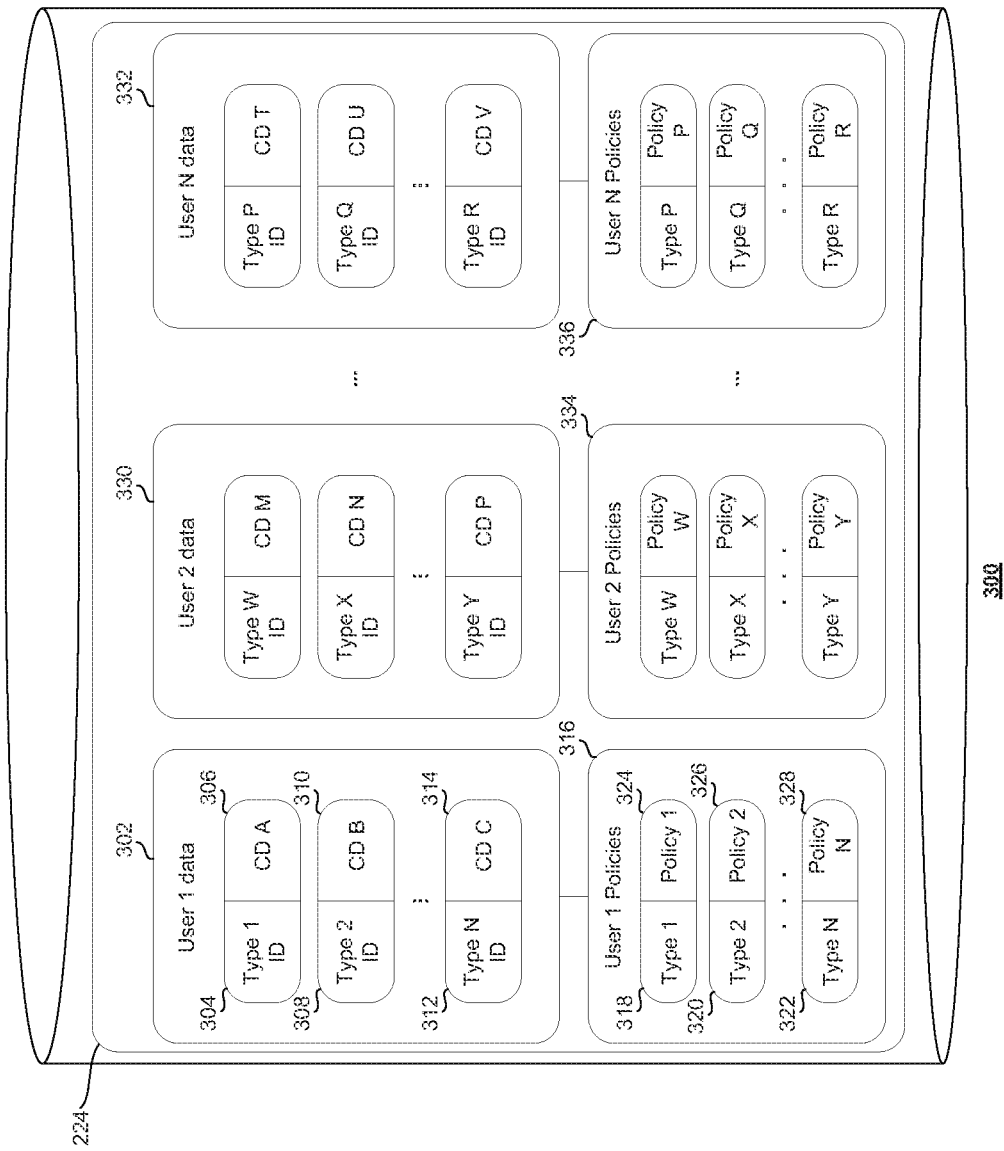
FIG. 3 depicts a database according to an embodiment.

Referring to FIG. 3, there is shown a view 300 of the database 224 in greater detail. Contact data; namely, user 1 data, user 2 data, user N data, and policies; namely, user 1 policies, user 2 policies and user N policies, are illustrated for a plurality of users.

The contact data 302 for the first user, that is, user 1, identifies one or more types of communication session in which the first user may participate together with respective contact data that can be used to establish a communication with an appropriate user agent of the first user. In the illustrated embodiment, it can be appreciated that the first user may participate in one or more of a plurality of different types of communication session. The data 302 for the first user comprises a first pair of associated data that identifies a first type of communication session 304 in which the respective user may participate together with the contact data 306 associated with a user agent of that respective participant that is apposite to such a communication session. It can be appreciated that the first user is also indicated as being able to participate in a second, different, type of communication session, as indicated by the type 2 communication session identification data 308, and respective contact data 310 is used to establish communication with an appropriate user agent of the first user for such a type 2 communication session. Finally, the first user is also indicated as being able to participate in a further type of communication session, as identified by the third type of communication session identification data 312, using contact data 314 of an appropriate user agent of the first user for such a communication session.

One or more policies 316 of the first user is or are associated with the above-described contact data 302 for the first user. The policies 316 govern the conditions under which the first user can participate in their respective types of communication sessions and, more particularly, the conditions under which the contact data 306, 310 and 314 can be used to establish communication sessions. In the illustrated embodiment, there are shown three pairs of relationships between data 318 to 322 identifying permissible types of communication session for the first user and policies 324 to 328 associated respectively with the communication session data 318 to 322. By way of example, the first policy 324 might prescribe the condition or conditions to be satisfied before the first user can be contacted in the form of an audio communication session while presently participating in a community TV communication session. The prescribed condition or conditions might be that the contact data 306 for establishing a type 1 communication session can only be used to establish contact with a participant of an existing type 2 communication session to which the first user is also a participant.

One skilled in the art appreciates that any of the illustrated policies can relate to any aspect of any existing or potential communication session or to any other feature. For example, the condition or conditions in the policies might relate to one or more of the following taken severally or jointly in any or all combinations and permutations: charging preferences, time of day preferences, at least one of number and identify of one or more of the current participants, available bandwidth, current data rates, or any other condition.

It can be appreciated that FIG. 3 also illustrates contact data 330 and 332 together with respective policies 334 and 336 for a plurality of other users; namely, user 2 to user N. The observations made above relating to the contact data 302 and policies 316 of user 1 are equally applicable to the contact data and policies of users 2 to N.

Figure 4:
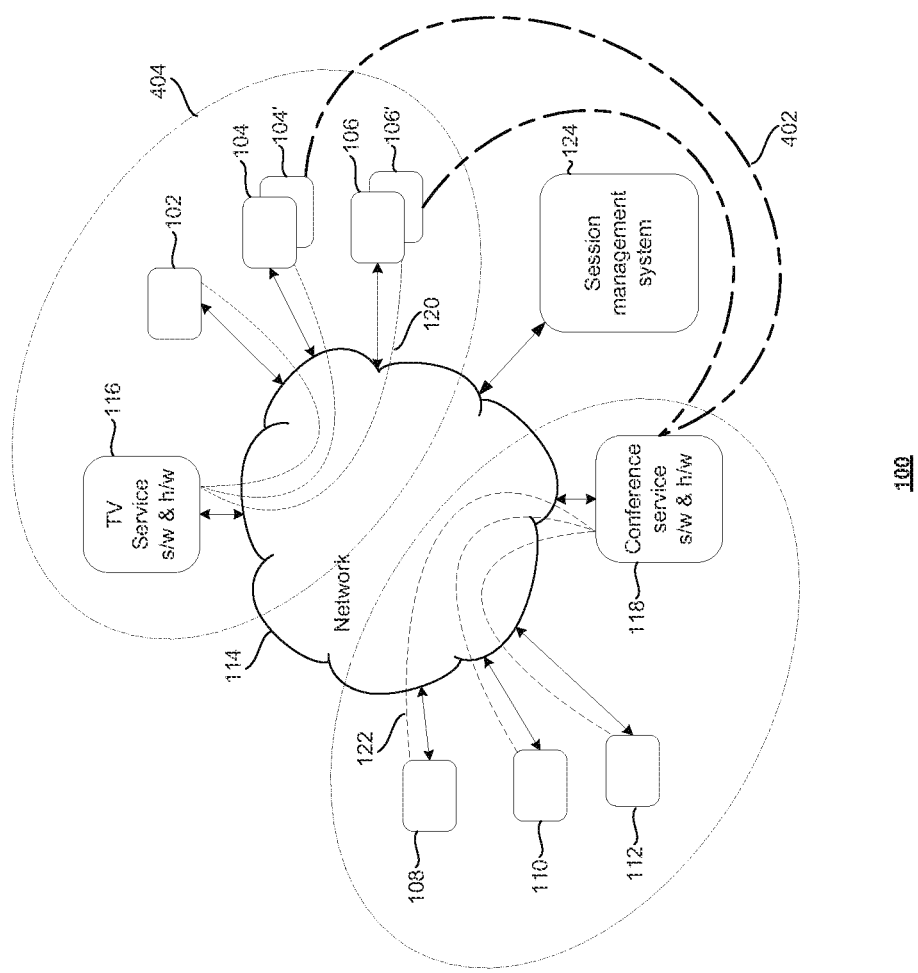
FIG. 4 shows a communication arrangement according to an embodiment.

Referring to FIG. 4, there is shown the communication arrangement 100 described with reference to FIG. 1 but which additionally comprises an audio communication session 402 established between a pair 104" and 106' of user agents associated with the users (not shown) of user agents 104 and 106 currently participating in a community TV communication session; the latter being denoted by the dashed ellipse 404.

FIG. 5 shows a signalling diagram or flowchart 500 of data exchanges and activities associated with establishing the audio conference 402 between the pair 104' and 106' of users currently participating in the community TV communication session 404 using user agents 104 to 106. It can be appreciated that data exchanges 502 and 504 needed to support the community TV communication session 404 between the TV service system 116 and the pair 104 and 106 of user agents are illustrated. Assume that the user of user agent 104 wishes to establish a further communication session, such as, for example, an audio communication session, with the user of user agent 106. A request 506 to establish such an audio communication session is sent from the user agent 104 to the session management system 124 or, more particularly, to the session invocation and management software 202. The request 506 comprises a session ID associated with the user agent 104 and a session identifier associated with user agent 106. The session invocation and management software 202 uses 508 the session ID of the user agent 104 and the session ID of user agent 106, firstly, to check that the users are able to participate in the requested type of communication session by accessing the contact data 302, 330 or 332 stored in the database 224 and, secondly, to ensure that any criterion or criteria, as defined in the policies of the users for establishing this type of communication session, is or are satisfied as a condition precedent to establishing the further communication session, which is an audio communication session in the present embodiment.

Assuming the condition or conditions prescribed by any appropriate policies has or have been satisfied, the contact data corresponding to the user agents 104' and 106' needed to establish the requested communication session, which is an audio communication session in the present example, is retrieved and forwarded in a communication 510 to the conferencing system 118. The conferencing system 118 provides an indication 512 and 514 to the user agents 104' and 106' associated with the contact data of those user agents 104' and 106' needed to establish the requested type of communication session. The conferencing system 118 signals 512 and 514, or at least instigates signalling associated with contacting, the user agents 104' and 106' according to their respective contact data with a view to establishing the requested type of communication session. Assuming that the user agents 104' and 106' respond positively, via responses 516 and 518, to the signalling 512 and 514, at least one of signalling and data exchanges 520 and 522 for supporting an audio conference between the user agents 104' and 106' takes place.

The newly established communication session, involving channels 520 and 522, may subsist instead of or in addition to the previously established communication session, involving channels 502 and 504.

It will be appreciated that the above embodiment has been described with reference to user agents 104 and 104' being different entities. However, embodiments are not limited thereto. Embodiments can be realised in which user agents 104 and 104' are one and the same entity. The same also applies additionally or alternatively to user agents 106 and 106'.

In the above embodiments, if one or both of the user agents 104' and 106' were unable to establish the specified communication session or declined to engage in the further communication session, appropriate signalling would have been conveyed to the conferencing system, which would, in turn, communicate the unavailability or negative response to the originating user agent.

Embodiments of the present invention have been described within the context of establishing an audio communication session between participants in a community TV communication session. However, embodiments are not limited to such types of communication session. Embodiments can equally well be realised using any other types of communication session such as, for example, instant messaging, videoconferencing, voice over IP, landline or mobile telephony, e-mailing or other messaging, or any other type of communication session. For example, users of user agents 108 and 110, who are currently engaged in an audio conference that includes user of user agent 112 might elect to establish instant messaging between themselves.

An advantageous consequence of using the session management system 124 together with session identifiers, session ID, associated with the user agents of the users to establish and manage communications and/or other exchanges between the user agents is that the privacy of the users of those user agents is preserved. It can be appreciated from the above-described embodiments, for example, assuming the user agents 104' and 106' are mobile telephones such that the contact data corresponds to respective mobile telephone numbers, that there is no need for the users to exchange such mobile telephone numbers. Embodiments of the invention allows users to confidently engage in exchanges with other users safe in the knowledge that any such engagement is on their terms and subject to any restrictions, as defined in their policies, they see fit to apply.

Embodiments of the above invention have been described with reference to the session management system 124 orchestrating matters. However, embodiments are not limited thereto. Embodiments can be realised in which the contact data associated with users can be communicated or supplied to a further communication entity that uses the supplied contact data to establish or at least instigate establishing a communication session of a prescribed type between two or more parties. The further communication entity is arranged to ensure that the contact data is never disclosed to the parties to the communication session to be established. This might be achieved using, for example, a call-me command issued by the further communication entity that is internally reconciled to establish contact between the parties.

One skilled in the art appreciates that a user has flexibility to define the policies however they see fit. Also, embodiments can be realised in which there are multiple policies for the same communication type. The multiple policies for the same communication type might be aimed at providing context-sensitive communication restrictions or conditions. For example, one skilled in the art might have a first policy that applies to a communication session according to a first set of prevailing conditions and also have a second policy that applies to the same communication session according to a second set of prevailing conditions.

The embodiments described herein are not limited to any particular hardware or software configuration; they may find applicability in any computing, consumer electronics, processing or communication environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system that causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as signaling gateways and systems such as SS7 systems or Session Initiation Protocol systems, intelligent network agents, mobile or stationary computers, personal digital assistants, set top boxes, mobile or cellular telephones and pagers, and other electronic devices or systems, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One skilled in the art appreciates that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing or communication environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention that are apparent to persons skilled in the art to which the invention pertains are deemed to lie within the spirit and scope of the invention.

The invention claimed is:

1. A method comprising:
a session management system receiving a request to establish a first type of communication session from a first user agent of a first user, the first type of communication session being provided by first service provider equipment, the request comprising a first session identifier associated with the first user agent and a second session identifier associated with a second user agent of a second user, and the request not including any contact data for the first and second user agents;
the session management system obtaining first contact data for a third user agent of the first user using the first session identifier obtained from the request;
the session management system obtaining second contact data for a fourth user agent of the second user using the second session identifier obtained from the request;
the session management system identifying, from a first set of policies for the first user, a first communication policy for the first user based on the requested first type of communication session;
the session management system identifying, from a second set of policies for the second user, a second communication policy for the second user based on the requested first type of communication session;
the session management system confirming that the first communication policy is met;
the session management system confirming that the second communication policy is met;
the session management system confirming that the first and second users have an established second, different type of communication session provided by second, different service provider equipment, the first user agent and the second user agent being user agents of the established second communication session;
and
in response to the request and the confirming, establishing, by the session management system on behalf of the first and second users, the first type of communication session, wherein the establishing comprises sending, by the session management system over a network to the first service provider equipment, the first contact data and the second contact data.

2. A method as claimed in claim 1, wherein establishing, on behalf of the first and second users, the first type of communication session comprises establishing at least one of a messaging communication session, a video communication session, and an audio communication session.

3. A method as claimed in claim 1, wherein sending the contact data to the first service provider equipment is to cause the first service provider equipment to send signals to devices of the first and second users, for establishing the first type of communication session between the first and second users.

4. A method as claimed in claim 1, wherein the established first type of communication session provided by the first service provider equipment between the first and second users is in addition to the established second type of communication session provided by the second service provider equipment between the first and second users.

5. A method as claimed in claim 1, wherein the determining is further based on data indicating the types of communication sessions each of the first and second users is allowed to participate in.

6. A method as claimed in claim 5, further comprising: obtaining the communication policy from a database that correlates different communication policies to respective different types of communication sessions.

7. A session management system comprising:
   at least one processor to:
   receive a request to establish a first type of communication session from a first user agent of a first user, the first type of communication session being provided by first service provider equipment, the request comprising a first session identifier associated with the first user agent and a second session identifier associated with a second user agent of a second user and the request not including any contact data identifying the first and second users;
   obtain first contact data for a third user agent of the first user using the first session identifier obtained from the request;
   obtain second contact data for a fourth user agent of the second user using the second session identifier obtained from the request;
   identify, from a first set of policies for the first user, a first communication policy for the first user based on the requested first type of communication session;
   identify, from a second set of policies for the second user, a second communication policy for the second user based on the requested first type of communication session;
   confirm that the first communication policy is met;
   confirm that the second communication policy is met;
   confirm the first and second users have an established second, different type of communication session provided by second, different service provider equipment;
   and
   in response to the request and the confirming, establish, on behalf of the first and second users, the first type of communication session, by sending the first contact data and the second contact data to the first service provider equipment.

8. A session management system as claimed in claim 7, wherein the established first type of communication session provided by the first service provider equipment between the first and second users is in addition to the established second type of communication session provided by the second service provider equipment between the first and second users.

9. A non-transitory machine readable storage medium storing machine executable instructions that upon execution cause a session management system to:
   receive a request to establish a first type of communication session from a first user agent of a first user, the first type of communication session being provided by first service provider equipment, the request comprising a first session identifier associated with the first user agent and a second session identifier associated with a second user agent of a second user and the request not including any contact data identifying the first and second users;
   obtain first contact data for a third user agent of the first user using the first session identifier obtained from the request;
   obtain second contact data for a fourth user agent of the second user using the second session identifier obtained from the request;
   identify, from a first set of policies for the first user, a first communication policy for the first user based on the requested first type of communication session;
   identify, from a second set of policies for the second user, a second communication policy for the second user based on the requested first type of communication session;
   confirm that the first communication policy is met;
   confirm that the second communication policy is met;
   confirm the first and second users have an established second, different type of communication session provided by second, different service provider equipment;
   and
   in response to the request and the confirming, establish, on behalf of the first and second users, the first type of communication session, by sending the first contact data and the second contact data to the first service provider equipment.

* * * * *